US011122246B2

(12) United States Patent
Dell

(10) Patent No.: US 11,122,246 B2
(45) Date of Patent: Sep. 14, 2021

(54) MULTIPLE OBSERVER IMPROVEMENT FOR A VIRTUAL ENVIRONMENT

(71) Applicant: EUCLIDEON HOLOGRAPHICS PTY LTD, Queensland (AU)

(72) Inventor: Bruce Robert Dell, Queensland (AU)

(73) Assignee: EUCLIDEON HOLOGRAPHICS PTY LTD, Brisbane (AU)

( * ) Notice: Subject to any disclaimer, the term of this patent is extended or adjusted under 35 U.S.C. 154(b) by 0 days.

(21) Appl. No.: 16/632,148

(22) PCT Filed: Jul. 18, 2018

(86) PCT No.: PCT/AU2018/050754
§ 371 (c)(1),
(2) Date: Jan. 17, 2020

(87) PCT Pub. No.: WO2019/014718
PCT Pub. Date: Jan. 24, 2019

(65) Prior Publication Data
US 2020/0169712 A1  May 28, 2020

(30) Foreign Application Priority Data

Jul. 19, 2017 (AU) .............................. 2017902825

(51) Int. Cl.
*H04N 13/117* (2018.01)
*H04N 13/337* (2018.01)
(Continued)

(52) U.S. Cl.
CPC ......... *H04N 13/117* (2018.05); *H04N 13/334* (2018.05); *H04N 13/337* (2018.05); *H04N 13/368* (2018.05)

(58) Field of Classification Search
None
See application file for complete search history.

(56) References Cited

U.S. PATENT DOCUMENTS 5,708,490 A    1/1998  Wieczorek
5,781,229 A *  7/1998  Zediker .................... H04N 5/74
                                                348/51

(Continued)

FOREIGN PATENT DOCUMENTS

EP         3242274 A1    11/2017
WO      2016108720 A1     7/2016

OTHER PUBLICATIONS

International Search Report and Written Opinion from PCT Application No. PCT/AU2018/050754, dated Nov. 6, 2018.

(Continued)

*Primary Examiner* — Christopher Braniff
(74) *Attorney, Agent, or Firm* — Workman Nydegger

(57) ABSTRACT

A virtual reality imaging system for two or more users including: at least one screen for presenting images of a virtual environment to two or more users; an imaging assembly, including two or more sets of projectors corresponding to the two or more users for producing images on the at least one screen; a tracking system that is configured to track each of the two or more users; a computer that is programmed to produce stereo 3D images of the virtual environment corresponding to tracking data from the tracking system for phone providing different views of the same virtual environment; stereo 3D glasses arranged to provide stereo 3D images; and an image separation arrangement whereby each user sees images emanating from a corresponding one of the sets of projectors only.

10 Claims, 7 Drawing Sheets

(51) Int. Cl.
*H04N 13/368* (2018.01)
*H04N 13/334* (2018.01)

(56) References Cited

U.S. PATENT DOCUMENTS

| | | | |
|---|---|---|---|
| 7,524,053 B2 | 4/2009 | Lipton | |
| 7,832,869 B2 * | 11/2010 | Maximus | G02B 26/007 |
| | | | 353/7 |
| 9,541,901 B2 | 1/2017 | Rotschild et al. | |
| 9,651,791 B2 | 5/2017 | Baum | |
| 10,187,635 B2 | 1/2019 | Sevostianov | |
| 2007/0127121 A1 | 6/2007 | Maximus et al. | |
| 2010/0289969 A1 | 11/2010 | Yamazaki et al. | |
| 2017/0366805 A1 | 12/2017 | Sevostianov | |

OTHER PUBLICATIONS

International Preliminary Report on Patentability from PCT Application No. PCT/AU2018/050754, dated Nov. 15, 2019.
Agrawala et al., "The Two-User Responsive Workbench: Support for Collaboration Through Individual Views of a Shared Space," Proceedings of the 24th Annual Conference on Computer Graphics and Interactive Techniques, ACM Press/Addison-Wesley Publishing Co.,1997.
Extended Search Report from corresponding EP Application No. EP18835742.0, dated Mar. 17, 2021.

\* cited by examiner

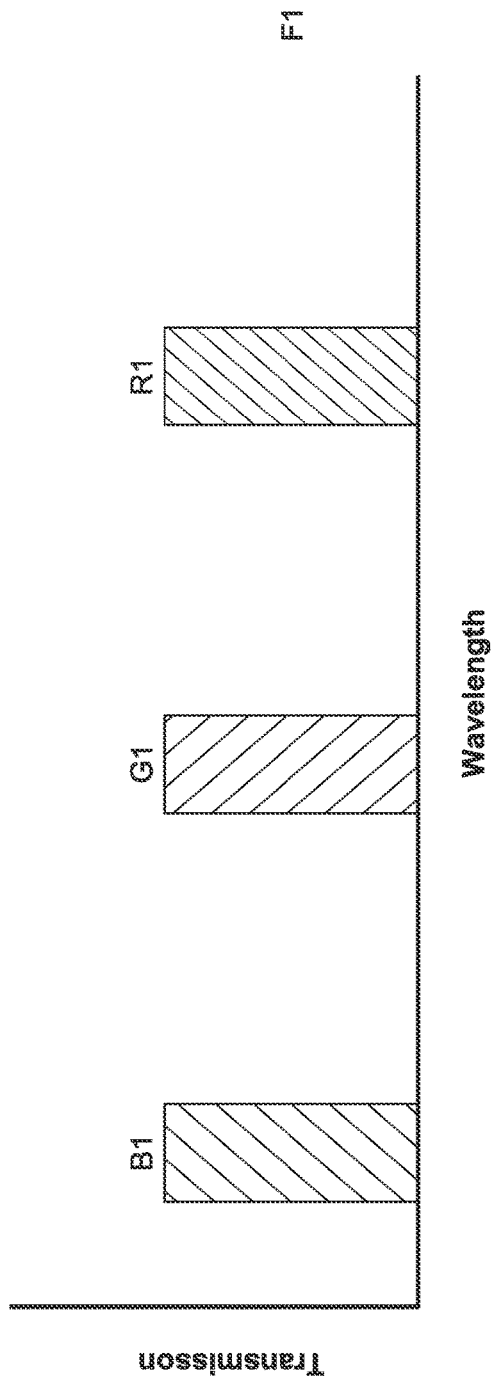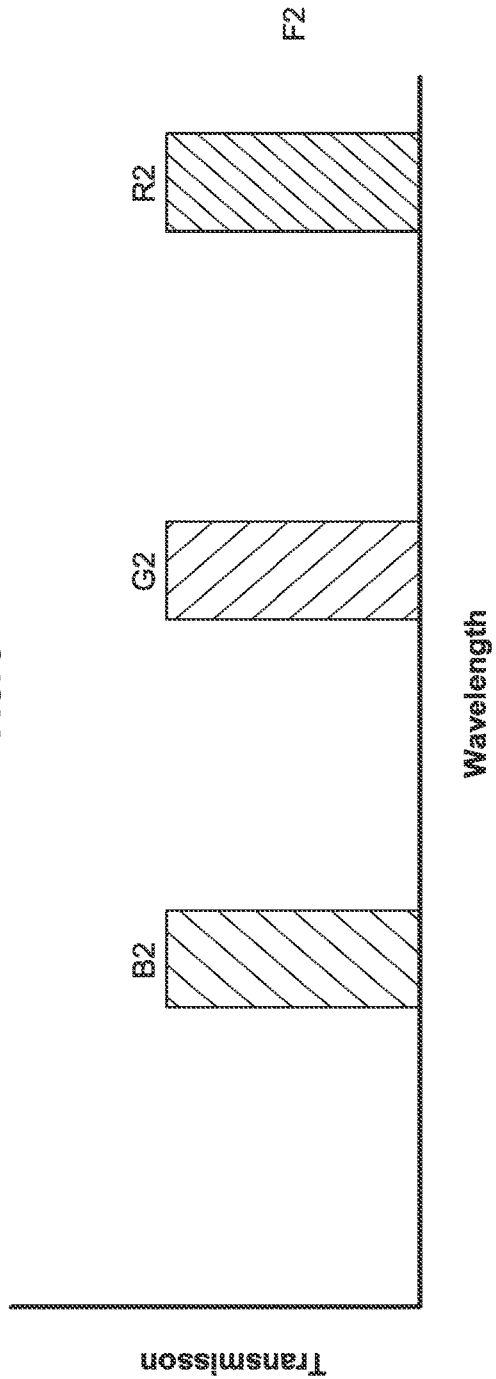

MULTIPLE OBSERVER IMPROVEMENT FOR A VIRTUAL ENVIRONMENT

TECHNICAL FIELD

The present invention relates to a computer assisted virtual reality display system.

BACKGROUND

Any references to methods, apparatus or documents of the prior art are not to be taken as constituting any evidence or admission that they formed, or form part of the common general knowledge.

In one type of computer assisted virtual reality display system there is provided:
1. At least one screen for presenting images of a virtual environment to a user;
2. An imaging assembly, including at least one projector for producing images on the at least one screen;
3. A tracking system that is configured to track the users' view point and viewing direction;
4. A computer that is programmed to respond to the tracking system and thereby control the imaging assembly to produce stereo 3D images of the virtual environment in response to the tracking system; and
5. Stereo 3D glasses worn by the user in order for the user to perceive the stereo 3D images.

The present applicant operates a recreational virtual reality center that includes the above components on a commercial basis at 59 Nerang St, Southport, Queensland, 4215, Australia (http://holoverse.com.au).

While the above system has been found to work very well it will be realized that each display system is adapted for generating a display specifically for the particular user that is being tracked. Consequently, if a second person views the display they will not see the display from their viewpoint but rather from the view point of the first person who is the user that is being tracked by the tracking system. Therefore, for the second person the 3D scene being presented will not change dynamically in accordance with the second person's movements and so there will be no illusion of virtual reality for the second person.

It is an object of the present invention to address the above described problem.

SUMMARY OF THE INVENTION

According to a first embodiment of the present invention there is provided a virtual reality imaging system for two or more users including:
a. at least one screen for presenting images of a virtual environment to two or more users;
b. an imaging assembly, including two or more sets of projectors corresponding to the two or more users for producing images on the at least one screen;
c. a tracking system that is configured to track each of the two or more users;
d. a computer that is programmed to respond to the tracking system and thereby control the imaging assembly to produce stereo 3D images of the virtual environment corresponding to tracking data from the tracking system for each of the two or more users for each user to perceive different views of the same virtual environment appropriate to their position;
e. stereo 3D glasses worn by each of the two or more users in order for the users to perceive the stereo 3D images; and
f. an image separation arrangement to present images from the two or more sets of projectors to corresponding ones of the two or more users whereby each user sees images emanating from a corresponding one of said sets of projectors only.

Preferably the image separation arrangement includes two or more filters for separating images from the two or more sets of projectors wherein the different viewing filters have different visible light spectral transmission characteristics.

In a preferred embodiment of the invention the filters comprise interference filters. For example, the filters may comprise films of dichroic material.

Preferably the filters of the image separation arrangement comprise corresponding viewer and projector interference filters, wherein a viewer interference filter is mounted to the stereo 3D glasses for the user and projector interference filters are mounted to projectors of the corresponding set of projectors.

In an alternative embodiment the stereo 3D glasses comprise first and second visible light filter windows and the image separation arrangement comprises a polarization or active shutter filter.

In a preferred embodiment of the invention the virtual reality imaging system includes a table wherein the least one screen comprises a translucent table top of the table. Preferably said projectors are arranged below the screen for projecting on an underside thereof.

The table may be rectangular wherein the tracking system comprises four sensors that are located at the four corners of the table.

According to a further aspect of the present invention there is provided a pair of wearable stereo 3D glasses comprising:
a. left eye and right eye stereoscopic image windows for distinguishing stereoscopic left and right images to thereby create a perception of three dimensional shape for a user; and
b. a common filter material adjacent the left eye and right eye windows for allowing passage of correspondingly pre-filtered light therethrough and for preventing passage of non-correspondingly pre-filtered light.

In a preferred embodiment of the invention the left eye and right eye stereoscopic image windows comprises active shutter windows.

Preferably the common filter material comprises an interference filter. For example the common filter material may comprise a dichroic film.

A set of the wearable stereo 3D glasses may be provided wherein each of the set includes common filter material having different visible light spectral transmission characteristics whereby the common filter material of each of the set have orthogonal transmission characteristics.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows:
a.

c. FIG. 3 is a visible light spectral transmission graph for a first interference filter used in the system of FIGS. 1 and 2.

d. FIG. 4 is a visible light spectral transmission graph for a second interference filter used in the system of FIGS. 1 and 2.

DETAILED DESCRIPTION OF PREFERRED EMBODIMENTS

Figure 1:
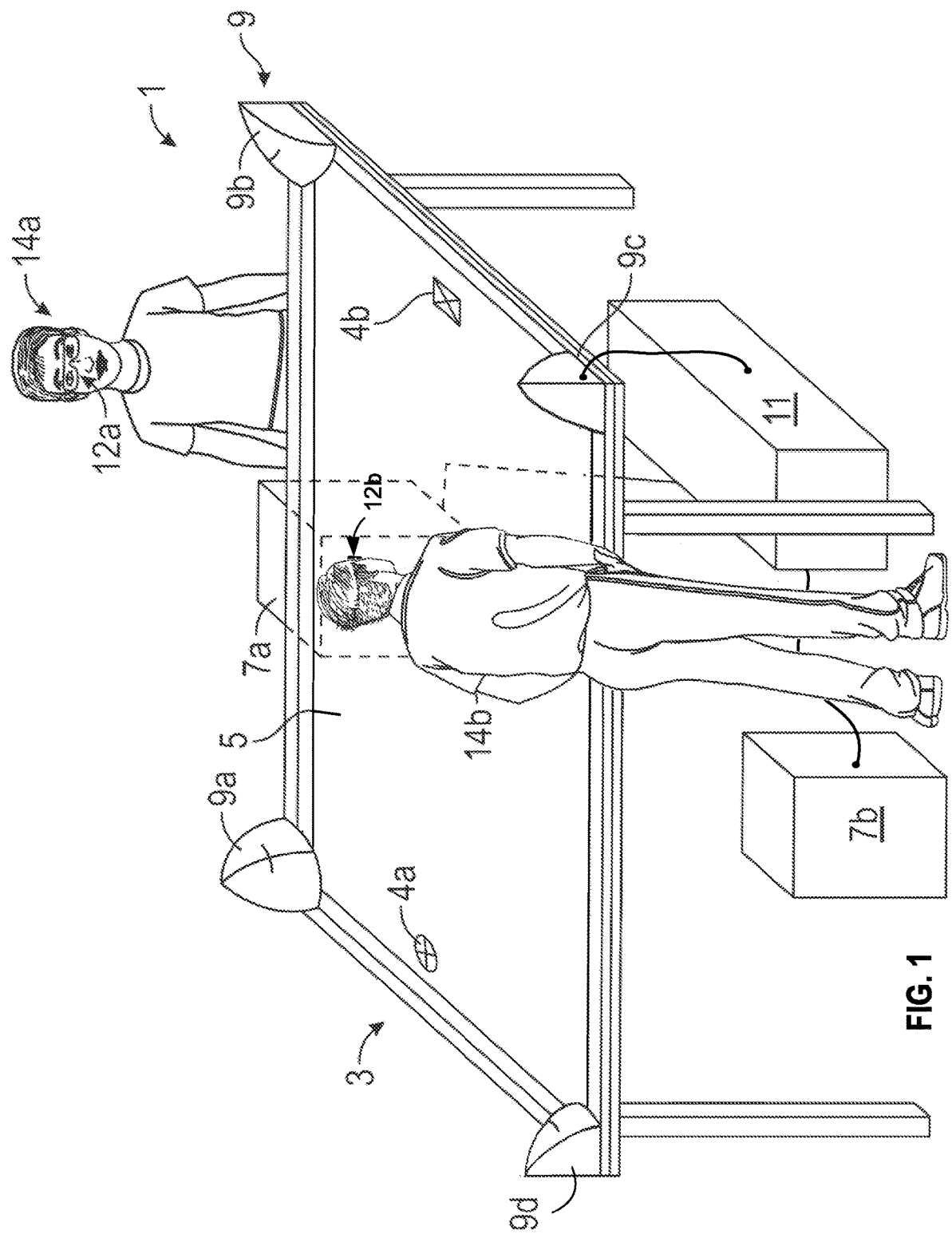
FIG. 1 depicts a virtual reality imaging system for two or more users in use.
b.

Referring now to FIG. 1 there is depicted a virtual reality imaging system 1 for two or more users according to a first embodiment of the present invention.

The system includes a rectangular table 3 that has a screen in the form of a translucent table top 5, for example a web or sheet of translucent material for presenting images of a virtual environment to two or more users by rear projection, i.e. projection onto the screen from beneath for viewing from above. Two orientation stickers 4a, 4b comprising a circle and a rectangle respectively are fastened at opposite ends of the table 3 so that the orientation of the table can be readily discerned in the following figures. In use the orientation stickers 4a, 4b are unnecessary and are only included herein to assist in the understanding of the following description.

System 1 also includes an imaging assembly which is comprised of two sets of projectors each comprising a single projector being respectively projectors 7a (visible in FIG. 5) and 7b which are located below the screen 5 of the table 3. Projectors 7a and 7b are arranged to project on to the underside of the translucent screen 5.

A tracking system 9 is provided that comprises sensors 9a, ..., 9d. The sensors 9a, ..., 9d are configured to sense the position and orientation of targets 10a, 10b (best seen in FIG. 2) affixed to special glasses 12a, 12b, that are worn by users 14a, 14b of the system. In the presently discussed embodiment each of the sensors is located at a corner of the rectangular table top as illustrated in the Figures. Various arrangements for tracking an object in 3D space are known in the prior art.

System 1 further includes a computer 11 that is specially programmed as will be discussed and which is coupled to the projectors 7a, 7b and to the tracking sensors 9a, ..., 9d.

The computer 11 is programmed to respond to the tracking system 9 and thereby control the imaging assembly, namely projectors 7a and 7b to produce stereo 3D images of a virtual environment corresponding to tracking data from the tracking system for each of the two or more users 14a, 14b. As is known in the prior art, the virtual environment may comprise a vertex and edge polygon model or an octree type solid mode stored in computer system 11 or accessible thereto.

Figure 2:
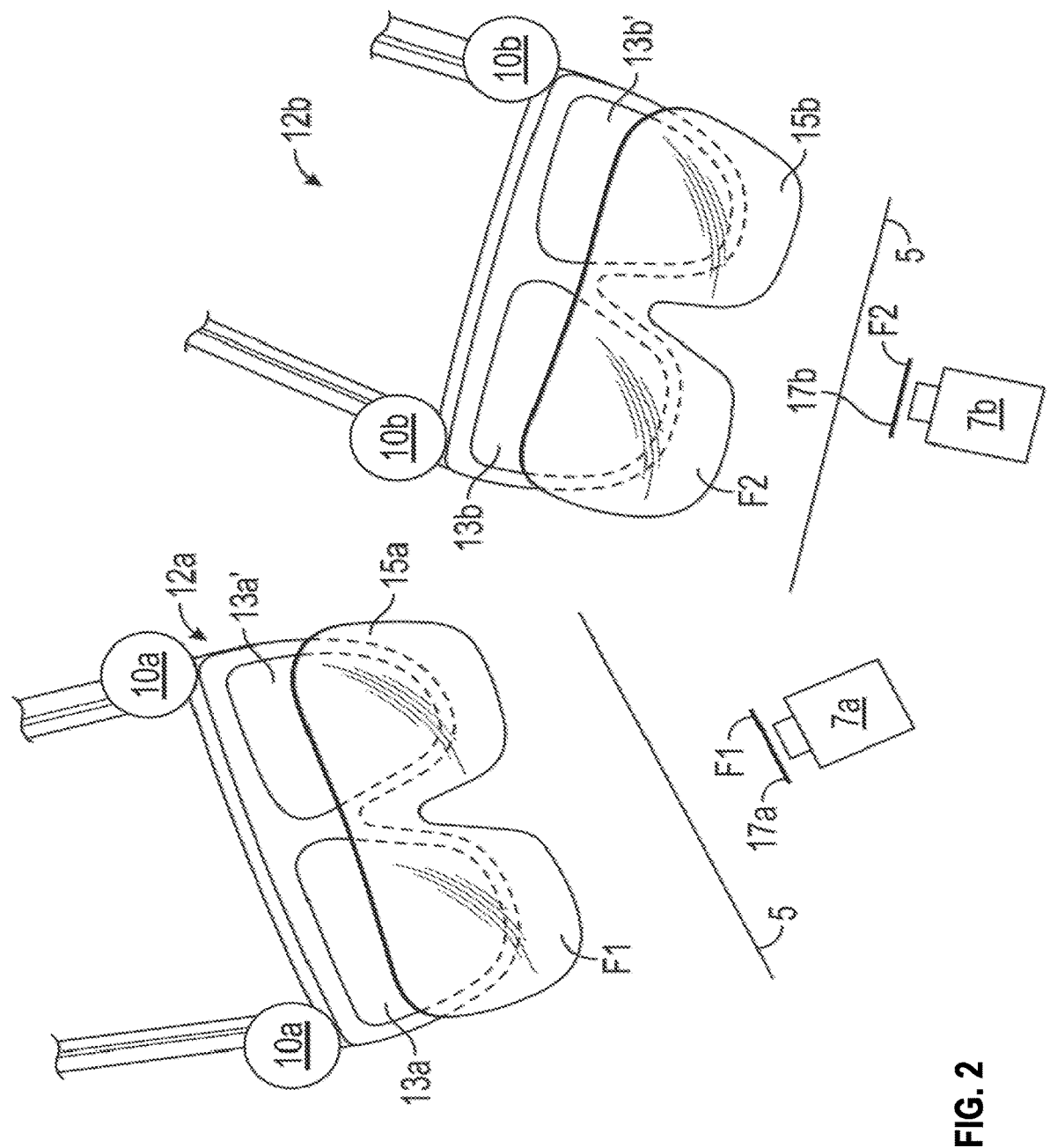
FIG. 2 schematically illustrates components of the imaging system of FIG. 1.

With reference to FIG. 2, the system 1 includes stereo 3D glasses 12a, 12b that are worn by each of the users 14a, 14b in order for the users to perceive the stereo 3D images. Each of the glasses 12a, 12b includes first and second active shutter windows 13a, 13a' and 13b, 13b' respectively. The action of the shutter windows is synchronized to the stereoscopic images generated by the corresponding projectors 7a, 7b. Active shutter stereoscopic glasses are well known and used for perceiving 3D stereoscopic images, for example from suitably equipped LCD and plasma televisions. Other types of stereoscopic systems may also be used such as differently polarized left and right windows (though these suffer from loss of 3D effect as the head is tilted) and anaglyphic windows, e.g. red/cyan windows (however anaglyphic windows typically cause a loss of color realism).

The system also includes an image separation arrangement to present images from the two or more projectors 7a, 7b to corresponding ones of the two or more users whereby each user sees images emanating from a corresponding one of said projectors only.

The image separation arrangement of the presently described embodiment includes first and second interference filters 15a and 15b that fit over the shutter windows 13a, 13a' and 13b, 13b' respectively. The first and second interference filters 15a and 15b are formed of dichroic material and have different, orthogonal visible light spectral transmission characteristics. Filter 15a, which is made of filter material F1 has a first red (R1), blue (B1), green (G1) transmission characteristic as illustrated in FIG. 3. The second interference filter 15a, which is made of filter material F2 has a second red (R2), blue (B1), green (G1) transmission characteristic as illustrated in FIG. 4 that is non-overlapping with the transmission characteristic of filter material F1. Consequently, light that passes through filter F1 will be entirely blocked by filter F2 and vice versa. Accordingly, the filters F1 and F2 are said to have "orthogonal" transmission characteristics.

Returning again to FIG. 2, the image separation arrangement further includes projector filters 17a of material F1 and 17b of material F2 which fit over the output lenses of the projectors 7a and 7b respectively. Consequently, light from projector 7a is incident upon filter 17a of material F1. Only light with wavelengths falling within passbands B1, G1 and R1 (FIG. 3) of the filter material F1 passes through the filter. Accordingly, the light escaping from projector filter 17a can pass through glasses filter 15a, since filters 17a and 15a are made of the same material and have the same spectral bandpasses B1, G1, R1. Furthermore, only light with wavelengths falling within passbands B2, G2 and R2 (FIG. 4) of the filter material F2 passes through filter 17b of the second projector 7b.

Similarly, the light escaping from projector filter 17b can pass through glasses filter 15b, since filters 17b and 15b are made of the same material and have the same spectral bandpasses B2, G2, R2. However the first glasses filter 15a, which is made of material F1, will completely block light from the second projector filter 17b, which is made of material F2 because transmission characteristics of the F1 and F2 filter materials are orthogonal and have no overlap. Therefore, the paired glasses and projector lenses 15a, 17a and 15b, 17b serve to separate images from the projectors 7a and 7b so that only a wearer of glasses 12a can see images from projector 7a whereas only a wearer of glasses 12b can see images from projector 7b.

Whilst the preferred embodiment of the invention makes use of interference filters, namely dichroic filters 15a and 15b and projector filters 17a and 17b, other arrangements are possible. For example absorption filters may also be used and U.S. Pat. No. 9,651,791 in the name of Infitec GmbH describes a set of absorption filters that are suitable for image separation purposes.

Figure 5:
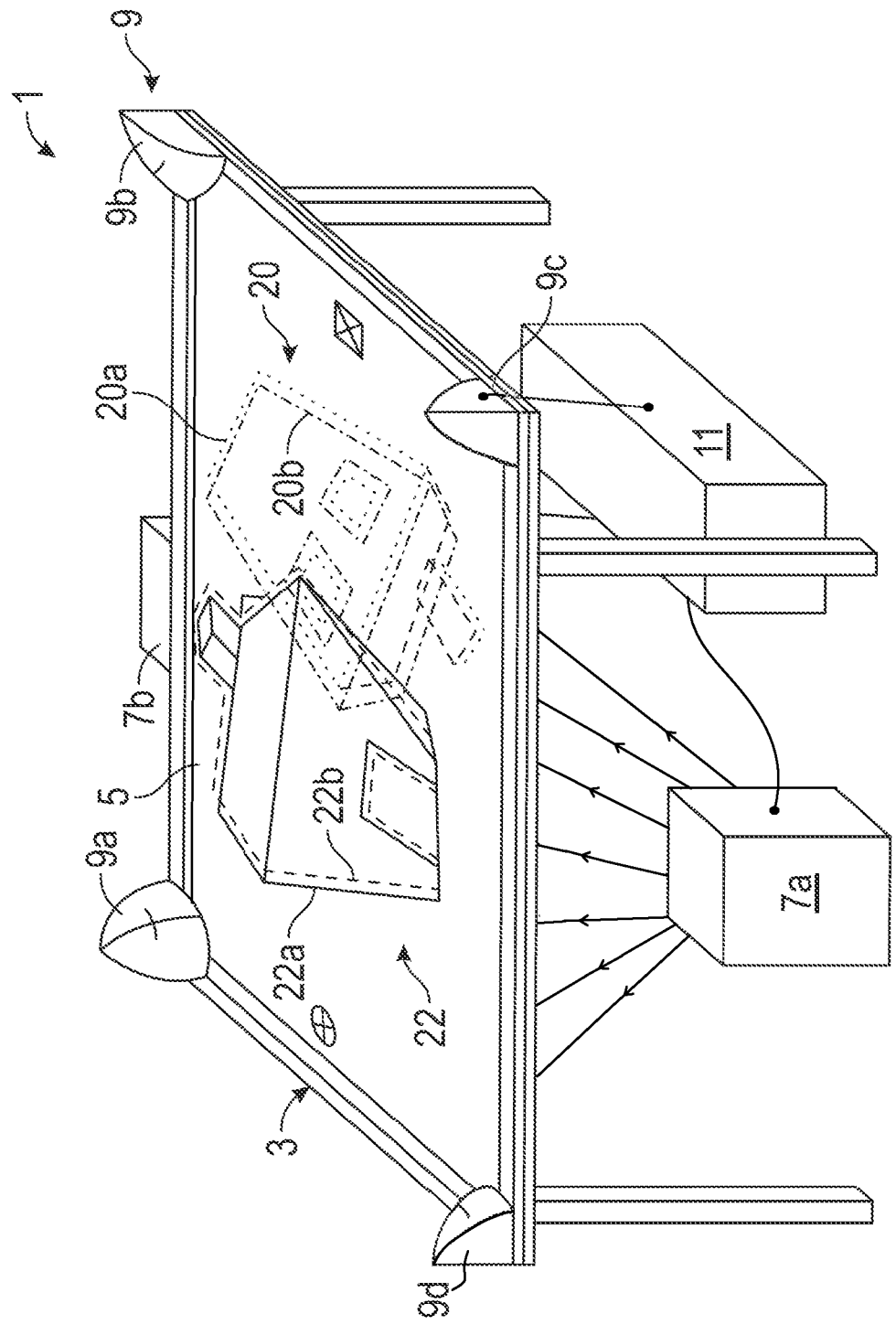
FIG. 5 illustrates the system of FIG. 1 in use when viewed by a user without the aid of the glasses that are illustrated in FIG. 2.

Referring now to FIG. 5, in use the tracking system 9 detects the position of targets 10a and 10b of the glasses 12a and 12b. Computer system 11 then operates projectors 7a and 7b to project corresponding stereoscopic images 20 and 22 on to the underside of translucent screen 5. The stereoscopic images 20 and 22 comprise two different views of the same 3D object. In the present example image 20 corresponds to a view of a house from the view direction of the first user 14a (FIG. 1) whereas image 22 corresponds to a view of the house from the view direction of the second user 14b (FIG. 1). The image shown rendered on the screen 5 in FIG. 5 is an approximation of what would be seen by a person that is not wearing any glasses at all. In this view it can be observed that the view 20 of the house for user 14a is made of images 20a for the left eye and image 20b for the right eye. Similarly, the view 22 of the house for user 14b is made of images 22a for the left eye and lines 22b for the right eye.

It will be realized that since the light that forms image 20 has come from projector 7a it has passed through filter 17a and so has been filtered according to transmission characteristic F1 of FIG. 3 whereas the light that forms image 22 has come from projector 7b and so has passed through filter 17b, thereby having transmission characteristic F2 of FIG. 4.

Figure 6:
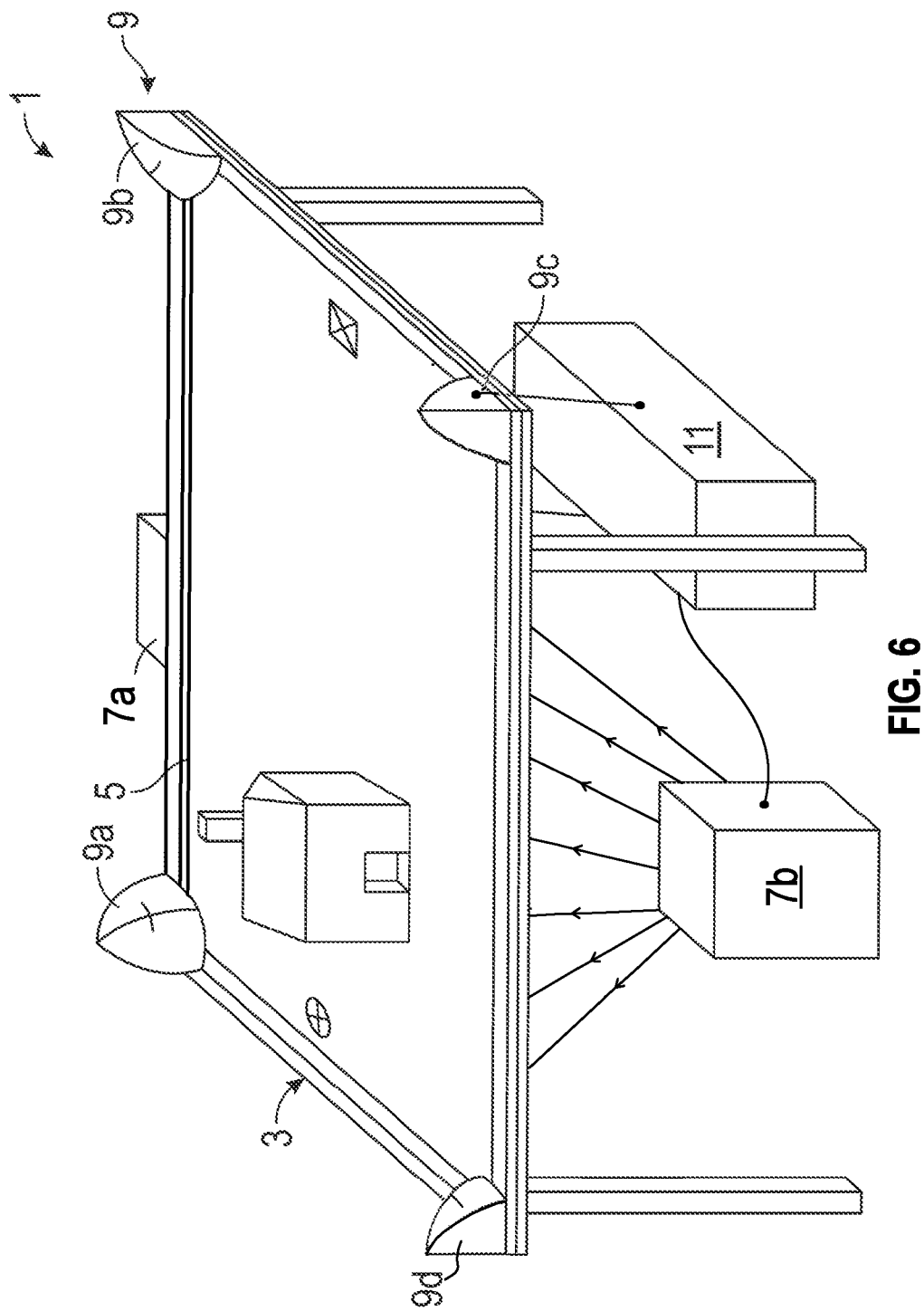
FIG. 6 illustrates a 3D stereoscopic first view of an object perceived by a first user wearing a first set of glasses of FIG. 2 when viewing the image shown in FIG. 5.

FIG. 6 shows the view 22 of the house that is seen by user 14b whilst wearing glasses 12b of FIG. 2. Firstly, the dichroic filter 15b prevents all light from projector 7a and filter 17a from passing so that user 14b does not receive any light for the image 20. However, the dichroic filter 15b allows the light from the projector 7b and filter 17b to pass to the active shutters 13b and 13b' of the glasses 12b. The action of the shutters 13b and 13b' assists the brain of the wearer 14b to perceive the stereoscopic 3D view 22 of the front of the house (i.e. with a single doorway) as shown in FIG. 6.

Figure 7:
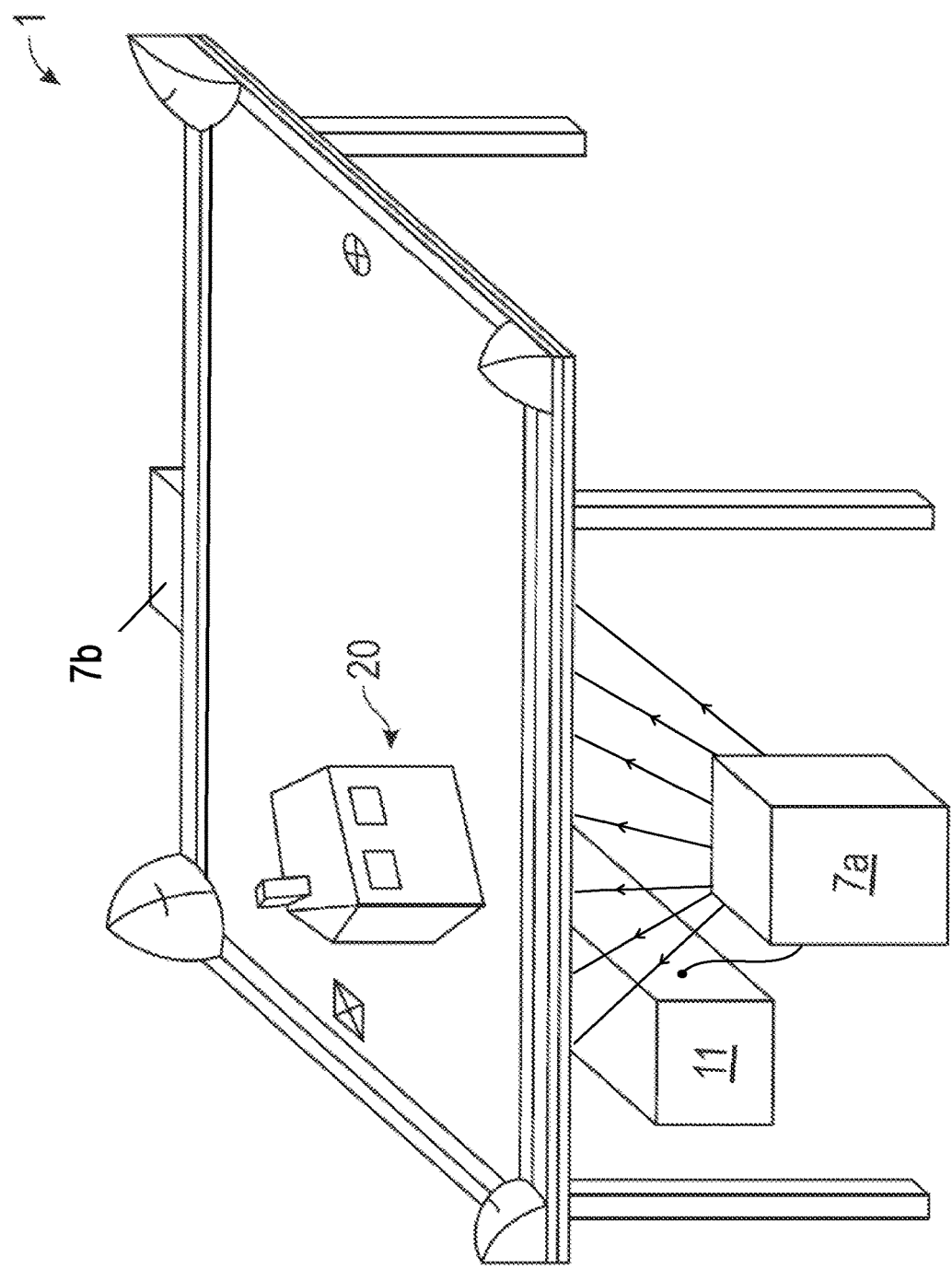
FIG. 7 illustrates a 3D stereoscopic second view of the object perceived by a second user wearing a second set of glasses of FIG. 2 when viewing the image shown in FIG. 5.

FIG. 7 shows the view 20 that is seen by user 14a whilst wearing glasses 12a of FIG. 2. Firstly, the dichroic filter 15a prevents all light from projector 7b and filter 17b from passing so that user 14a does not receive any light for the image 22. However, the dichroic filter 15a allows the light from the projector 7a and filter 17a to pass to the active shutters 13a and 13a' of the glasses 12a. The action of the shutters 13a and 13a' assists the brain of the wearer 14a to perceive the stereoscopic 3D view of the rear of the house (i.e. double windows) as shown in FIG. 7.

As the first and second users change their viewpoints and viewing directions, for example by turning their heads or by walking around the table 3, the computer system 11 monitors their positions via the tracking system 9 and adjusts the views of the virtual scene that are delivered by projectors 7a and 7b accordingly. Consequently, both users 14a, 14b see an appropriate view of the virtual scene from their viewpoint. Furthermore, the views of the scene for both the first and second users will change dynamically in accordance with each user's movements and so a virtual reality of the same scene will be perceived for both the first and the second user appropriate to their viewpoint.

Figure 8:
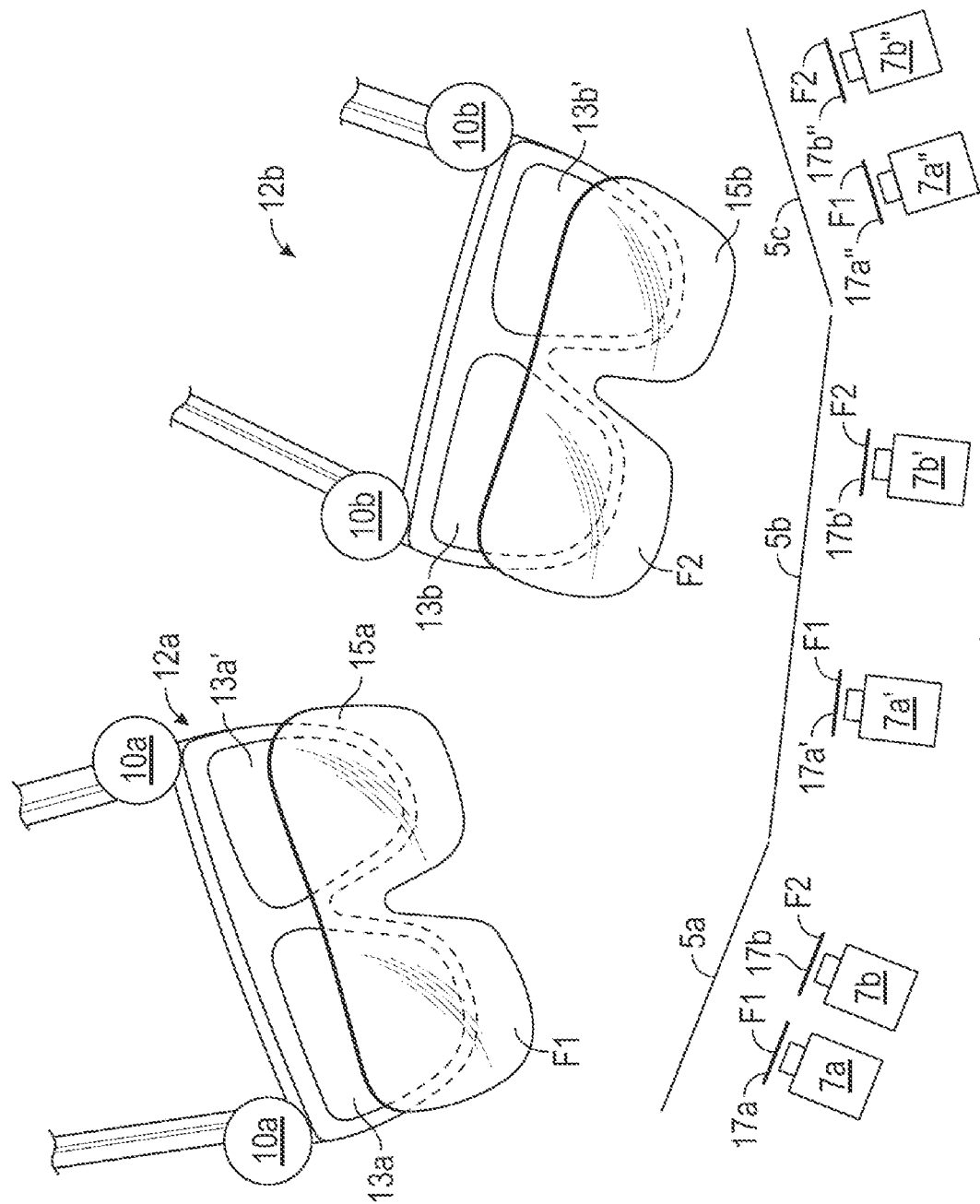
FIG. 8 illustrates a variation of the system depicted in FIGS. 1 and 2 wherein the images that are generated for each user are produced by sets of projectors each containing more than a single projector.

FIG. 8 schematically depicts an embodiment of the invention where the images for each user are delivered by sets of projectors comprising not just a single projector (e.g. projectors 7a and 7b of FIGS. 1 and 2) but by sets of multiple projectors. As shown in FIG. 8 a first set of projectors 7a, 7a' . . . 7a" is provided each fitted with F1 filters 17a, 17a', . . . , 17a" and a second set of projectors 7b, 7b' . . . 7b" is provided, each fitted with F2 filters 17b, 17b', . . . , 17b". As before, the first user wears glasses 12a which are fitted with F1 filter 15a for viewing images from the first set of projectors and blocking images from the second set of projectors. In contrast, the second user wears glasses 12b which are fitted with F2 filter 15b for viewing images from the second set of projectors and blocking images from the first set of projectors. As indicated in FIG. 8, the different projectors of each set of projectors may be arranged to project onto a corresponding plurality of separate projection screens 5a, . . . , 5c to assist in making an immersive virtual environment.

It will be realized that in other embodiments of the invention the stereo 3D glasses may comprise first and second filter windows and the image separation arrangement may comprise a polarization or active shutter filter for example.

Furthermore, while it is preferred that interference filters are used anaglyph red/cyan or other color pairs might be used for the image separation. However, interference filters are preferred since they maintain a realistic color balance.

While the preferred embodiment of the invention that has been discussed involves a system for presenting images to two users, systems to accommodate more users are contemplated. For example, three projectors may be used, each with one of three mutually orthogonal interference filters wherein the three users each wear stereoscopic glasses that are fitted with one of the filters for perceiving images from one of the three projectors similarly fitted with a corresponding filter.

It will also be realized that the projection screen that has been discussed, which comprises a translucent table top screen, may be replaced with another means upon which images may be projected, for example a translucent curtain with projectors disposed on either side may be used in other embodiments. Alternatively direct projection, i.e. reflective rather than transmission, screens such as a light colored wall may also be used.

In compliance with the statute, the invention has been described in language more or less specific to structural or methodical features. The term "comprises" and its variations, such as "comprising" and "comprised of" is used throughout in an inclusive sense and not to the exclusion of any additional features.

It is to be understood that the invention is not limited to specific features shown or described since the means herein described comprises preferred forms of putting the invention into effect.

The invention is, therefore, claimed in any of its forms or modifications within the proper scope of the appended claims appropriately interpreted by those skilled in the art.

Throughout the specification and claims (if present), unless the context requires otherwise, the term "substantially" or "about" will be understood to not be limited to the value for the range qualified by the terms.

Any embodiment of the invention is meant to be illustrative only and is not meant to be limiting to the invention. Therefore, it should be appreciated that various other changes and modifications can be made to any embodiment described without departing from the scope of the invention.

The invention claimed is:

1. A virtual reality imaging system for two or more users, the imaging system comprising:
- at least one screen that presents images of a virtual environment to two or more users;
- an imaging assembly, including two or more sets of projectors corresponding to the two or more users, that produces images on the at least one screen;

a tracking system that tracks each of the two or more users;

a computer that is programmed to respond to the tracking system and control the imaging assembly to produce stereo 3D images of the virtual environment corresponding to tracking data from the tracking system for each of the two or more users for each user to perceive different views of the same virtual environment appropriate to their position;

stereo 3D glasses configured to be worn by each of the two or more users in order for the users to perceive the stereo 3D images; and an image separation system that presents images from the two or more sets of projectors to corresponding ones of the two or more users such that each user sees images emanating from a corresponding one of said sets of projectors only.

2. The imaging system of claim 1, wherein the image separation system includes two or more filters for separating images from the two or more sets of projectors wherein the different viewing filters have different visible light spectral transmission characteristics.

3. The imaging system of claim 2, wherein the filters comprise interference filters.

4. The imaging system of claim 3, wherein the filters comprise films of dichroic material.

5. The imaging system of claim 3, wherein the filters of the image separation system comprise corresponding viewer and projector interference filters, wherein a viewer interference filter is mounted to the stereo 3D glasses for the user and projector interference filters are mounted to projectors of the corresponding set of projectors.

6. The imaging system of claim 1, wherein the stereo 3D glasses comprise first and second visible light filter windows and the image separation system comprises a polarization filter.

7. The imaging system of claim 1, wherein the stereo 3D glasses comprise first and second visible light filter windows and the image separation system comprises an active shutter filter.

8. The imaging system of claim 1, further comprising a table wherein the least one screen comprises a translucent tabletop of the table.

9. The imaging system of claim 8, wherein said projectors are arranged below the screen for projecting on an underside thereof.

10. The imaging system of claim 8, wherein the table is rectangular and has four corners, wherein the tracking system comprises four sensors that are located respectively at the four corners of the table.

* * * * *